(12) United States Patent
Patel et al.

(10) Patent No.: US 12,297,404 B2
(45) Date of Patent: May 13, 2025

(54) PROCESS AND SYSTEM FOR PRODUCING BIODIESEL

(71) Applicant: CHEMTOR, LP, Lockhart, TX (US)

(72) Inventors: Pulinkumar N. Patel, San Marcos, TX (US); Kei Fuchigami, Buda, TX (US)

(73) Assignee: Chemtor, LP, Lockhart, TX (US)

( * ) Notice: Subject to any disclaimer, the term of this patent is extended or adjusted under 35 U.S.C. 154(b) by 706 days.

(21) Appl. No.: 17/440,929

(22) PCT Filed: Mar. 20, 2020

(86) PCT No.: PCT/US2020/023860
§ 371 (c)(1),
(2) Date: Sep. 20, 2021

(87) PCT Pub. No.: WO2020/191294
PCT Pub. Date: Sep. 24, 2020

(65) Prior Publication Data
US 2022/0162518 A1 May 26, 2022

Related U.S. Application Data

(60) Provisional application No. 62/821,671, filed on Mar. 21, 2019.

(51) Int. Cl.
C11B 3/00 (2006.01)
B01D 11/04 (2006.01)
(Continued)

(52) U.S. Cl.
CPC .......... C11B 3/001 (2013.01); B01D 11/0488 (2013.01); B01D 11/0492 (2013.01);
(Continued)

(58) Field of Classification Search
CPC ....... C11C 3/04; C11C 3/003; B01D 11/0449; B01J 14/00; B01F 23/45; B01F 25/435; C11B 3/001
See application file for complete search history.

(56) References Cited

U.S. PATENT DOCUMENTS 7,514,575 B2 4/2009 Ginosar et al.
7,618,544 B2 11/2009 Massingill, Jr.
(Continued)

FOREIGN PATENT DOCUMENTS

CN 102597185 A 7/2012
WO WO 2016/115257 A2 7/2016

OTHER PUBLICATIONS

First Chinese Office Action for Chinese Patent Application No. 202080037301.5 issued by the China National Intellectual Property Administration, dated Oct. 10, 2022, (9 pgs.).
(Continued)

Primary Examiner — Yate' K Cutliff
(74) Attorney, Agent, or Firm — Haynes and Boone, LLP

(57) ABSTRACT

A method of producing biodiesel using a conduit contactor in fluid communication with a collection vessel includes: introducing a first stream including an alcohol proximate a plurality of fibers positioned within the conduit contactor and extending proximate to the collection vessel; introducing a second stream including an oil into the conduit contactor proximate to the plurality of fibers, wherein the second stream is in contact with the first stream; reacting the oil and the alcohol to for a single phase; receiving the single phase in the collection vessel; and separating biodiesel from the single phase.

11 Claims, 5 Drawing Sheets

(51) Int. Cl.
  *B01D 17/04* (2006.01)
  *C11C 3/00* (2006.01)
  *C11C 3/04* (2006.01)
(52) U.S. Cl.
  CPC ............ *B01D 17/047* (2013.01); *C11C 3/003* (2013.01); *C11C 3/04* (2013.01)

(56) References Cited

U.S. PATENT DOCUMENTS

| | | | | |
|---|---|---|---|---|
| 8,128,825 | B2* | 3/2012 | Massingill | B01D 11/0449 554/20 |
| 9,815,001 | B2 | 11/2017 | Massingill | |
| 2005/0080280 | A1* | 4/2005 | Yoo | C11C 3/10 554/174 |
| 2009/0158640 | A1* | 6/2009 | Kellens | C11C 1/103 554/167 |
| 2010/0071260 | A1* | 3/2010 | Massingill | B01J 14/00 44/388 |
| 2012/0277461 | A1* | 11/2012 | Roa-Espinosa | C07C 29/76 560/129 |
| 2013/0090488 | A1 | 4/2013 | Dietz | |

OTHER PUBLICATIONS

English Translation of First Chinese Office Action for Chinese Patent Application No. 202080037301.5 issued by the China National Intellectual Property Administration, dated Oct. 10, 2022, (14 pgs.).

Extended European Search Report for European Patent Application No. 20773634.9 issued by the European Patent Office, dated Dec. 12, 2022, (8 pgs.).

First Substantive Examination Report for Indonesian Patent Application No. P00 2021 08709 issued by the Ministry of Law and Human Rights, Republic of Indonesia, Directorate General of Intellectual Property, dated Oct. 5, 2022, (3 pgs.).

International Search Report and Written Opinion of the International Search Authority issued by the U.S. Patent and Trademark Office for International Application No. PCT/US2020/023860, mailed Aug. 19, 2020, 21 pages.

Kim, et al., Competitive transesterification of soybean oil with mixed methanol/ethanol over heterogeneous catalysts, Bioresource Technology 101 (2010) 4409-4414.

Mendes, Atahualpa Moura, Production of biodiesel from corn oil and ethanol by homogeneous alkali catalyzed transesterification, MSc. Thesis, Department of Chemical Engineering Royal Institute of Technology (KTH) Stockholm, Sweden, Apr. 2011, pp. 1-42.

Mendow, G. et al., Biodiesel production by two-stage transesterification with ethanol, Bioresource Technology 102 (2011) 10407-10413.

Mendow, G. et al., High performance purification process of methyl and ethyl esters produced by transesterification, Chemical Engineering Journal 228 (2013) 93-101.

Sánchez, B.S. et al., Transesterification of sunflower oil with ethanol using sodium ethoxide as catalyst. Effect of the reaction conditions, Fuel Processing Technology 131 (2015) 29-35.

Yusoff, Mohamad Firdaus Mohamad et al., Comparison of Fatty Acid Methyl and Ethyl Esters as Biodiesel Base Stock: a Review on Processing and Production Requirements, J Am Oil Chem Soc (2014) 91:525-531, DOI 10.1007/s11746-014-2443-0.

* cited by examiner

PROCESS AND SYSTEM FOR PRODUCING BIODIESEL

CROSS-REFERENCE TO RELATED APPLICATIONS

This application is a U.S. National Stage patent application of International Patent Application No. PCT/US2020/023860 filed on Mar. 20, 2020, which claims priority to U.S. Provisional Application No. 62/821,671 filed Mar. 21, 2019, the contents of which are herein incorporated in their entirety.

TECHNICAL FIELD OF THE DISCLOSURE

The present disclosure generally relates to the production of biodiesel from oil using a fiber conduit contactor. More particularly, the disclosure relates to contacting vegetable oils and/or animal oils with an alcohol within a fiber conduit contactor to form biodiesel.

BACKGROUND OF THE DISCLOSURE

Biodiesel generally refers to diesel fuel consisting of long chain alkyl esters derived from vegetable oils (including waste oils) and/or animal oils (i.e., animal fat) ("feedstock oil"). One method of producing biodiesel is by transesterification of a feedstock oil. Transesterification is the reaction of a lipid with an alcohol to form esters and a byproduct, glycerol; this reaction may be catalyzed by a caustic catalyst, such as a base. The reaction is reversible, and therefore a molar excess of alcohol is required to force equilibrium to the product side. An example of this reaction is shown in the following Reaction Scheme 1:

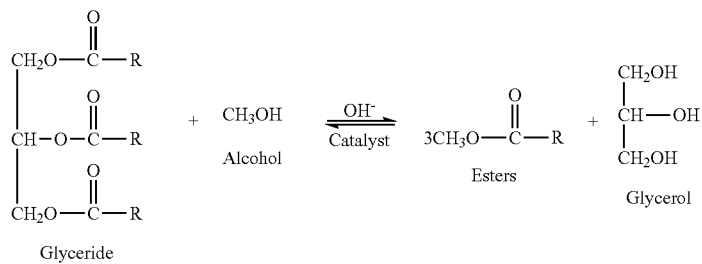

Reaction Scheme 1: Transesterification of Triglyceride to Form Esters

Due to the immiscible nature of the feedstock oil and alcohol, one method of reacting these components includes creating dispersions of one phase in the other to generate small droplets with a large surface area where mass transfer and reaction can occur. After mixing the reactants, separation of the phases is needed for product purity and quality. However, when using dispersion methods, separation of phases can be difficult and time consuming. Further, due to the partial solubility of alcohol in biodiesel, washing the separated biodiesel phase with water is generally required to remove dissolved/miscible alcohol, residual glycerol, and catalyst.

A fiber conduit contactor may be employed to provide increased surface area to facilitate reaction between immiscible liquids while avoiding agitation of the immiscible liquids and the resultant forming of dispersions/emulsions that are difficult to separate. Examples of fiber conduit contactors are described in U.S. Pat. Nos. 7,618,544 and 8,128,825, both of which are incorporated herein in their entireties.

When employing a fiber conduit contactor, the immiscible liquids are generally not permitted to mix to form a dispersion or an emulsion, and the output therefrom generally includes two distinct phases. As such, when using a fiber conduit contactor to facilitate the transesterification reaction between a feedstock oil and an alcohol, it would be expected that the reaction product would include two phases: a biodiesel phase and a glycerol phase (including glycerol, residual alcohol, caustic catalyst (if used), and any other extracted components such as salts of free fatty acids (soaps)). However, it was herein surprisingly found that the fiber conduit contactor was effective even when only one phase is formed, e.g. when the alcohol included ethanol at a 5:1 or greater molar ratio to the triglyceride. Without being bound by theory, it is believed that the solubility of the ethanol in both the biodiesel (ester) and the glycerol (the caustic phase) renders these phases soluble in each other, which results in the single-phase reaction product.

Single-phase mixtures in ethanol biodiesel synthesis are well known in the literature. For example, Kim et al. (*Competitive transesterification of soybean oil with mixed methanol/ethanol over heterogeneous catalysts,* 101 Bioresource Technology 4409-4414 (2010)) found that transesterification of soybean oil with ethanol using 0.6% catalyst and a 10:1 molar ratio of alcohol to triglyceride approached 95% conversion in one hour, and with a 15:1 molar ratio approached 98% conversion. In both cases, a single phase was formed that included all reaction components and products. The necessary water washto remove these impurities from the biodiesel product was complicated by the presence of soap, which favored the production of stable emulsions. Mendes (*M.S. Thesis*, Royal Institute of Technology, Stockholm. pp. 1-42 (2011)) and Yusoff et al. (Mohamad Firdaus Mohamad Yusoff, Xuebing Xu & Zheng Guo, *Comparison of Fatty Acid Methyl and Ethyl Esters as Biodiesel Base Stock: a Review on Processing and Production Requirements,* 91 Journal of the American Oil Chemists Society 525-531 (2014)) reviewed the literature and reported biodiesel synthesis rates in the range of 90-95% in a single phase with 9:1 molar ratios of ethanol:triglycerides. These studies all point to the need for significant molar excesses of alcohol coupled with large quantities of catalyst to drive the transesterification reaction above 95% completion. They also confirm the inherent difficulty in washing the ethyl esters to remove excess ethanol, glycerol, catalyst and soaps due to the tendency to form persistent emulsions which even extensive settling times and/or centrifugation cannot break.

While most biodiesel syntheses rely on a high molar ratio of alcohol to triglyceride, generally in the range or 6:1 to 12:1, in order to drive the transesterification reaction to levels above 99%, Mendow et al. (*Biodiesel production by two-stage transesterification with ethanol,* 102 Bioresource Technology 10407-10413 (2011)) showed that a 99% conversion efficiency can be reached at lower concentrations of alcohol (4.25:1), where the ethanol transesterification remained a 2-phase chemistry. However, achieving this 99% conversion efficiency required two repetitions of a process involving mixing the reaction components (including 1.06% sodium ethoxide catalyst), stirring at temperature, settling, and finally, decanting of the glycerol phase. Furthermore, the process produced a significant amount of soap, reducing yields and resulting in a crude ethanol biodiesel that was extremely difficult to purify, requiring two separate washes, first with plain water and second with acidified water, in order to remove residual alcohols, catalyst and soap from the biodiesel without creating an emulsion (see G. Mendow & C.a. Querini, *High performance purification process of methyl and ethyl esters produced by transesterification,* 228 Chemical Engineering Journal 93-101 (2013)). Additional work (see, e.g., B. Sánchez et al., *Transesterification of sunflower oil with ethanol using sodium ethoxide as catalyst. Effect of the reaction conditions,* 131 Fuel Processing Technology 29-35 (2015)) showed that it was possible to produce acceptable biodiesel in a single round of mixing the reaction components (including 1.66% sodium ethoxide catalyst), stirring at temperature, settling, and finally, decanting of the glycerol phase. However, the very high level of catalyst usage was uneconomical and the resulting crude biodiesel still required two rounds of water washing to remove impurities without forming an emulsion.

BRIEF SUMMARY OF THE DISCLOSURE

As compared with dispersion methods described above, the use of the fiber conduit contactor to produce biodiesel as described herein results in an efficient single stage process. Initially, before sufficient esters have accumulated to render the phases miscible, a two-phase chemical reaction is facilitated by the large surface area provided by the fibers in the fiber conduit contactor. As the reaction progresses, the miscibility of the biodiesel phase and the glycerol phase results in a single phase which provides substantial further contact between any remaining feedstock oil and the alcohol. As a result, biodiesel conversion rates may be greatly increased while using a continuous process.

After the reaction is complete, the resulting single phase (including both the biodiesel phase and the glycerol phase) may be separated by washing with an appropriate agent, such as water. Such a washing process may be conducted in a fiber conduit contactor or alternatively may be conducted by any other suitable technique. According to the method of the present disclosure, the biodiesel water washing and phase separation may be achieved in a single step in a fiber conduit contactor as compared to conventional methods that require two distinct washing steps.

DETAILED DESCRIPTION

Figure 1:
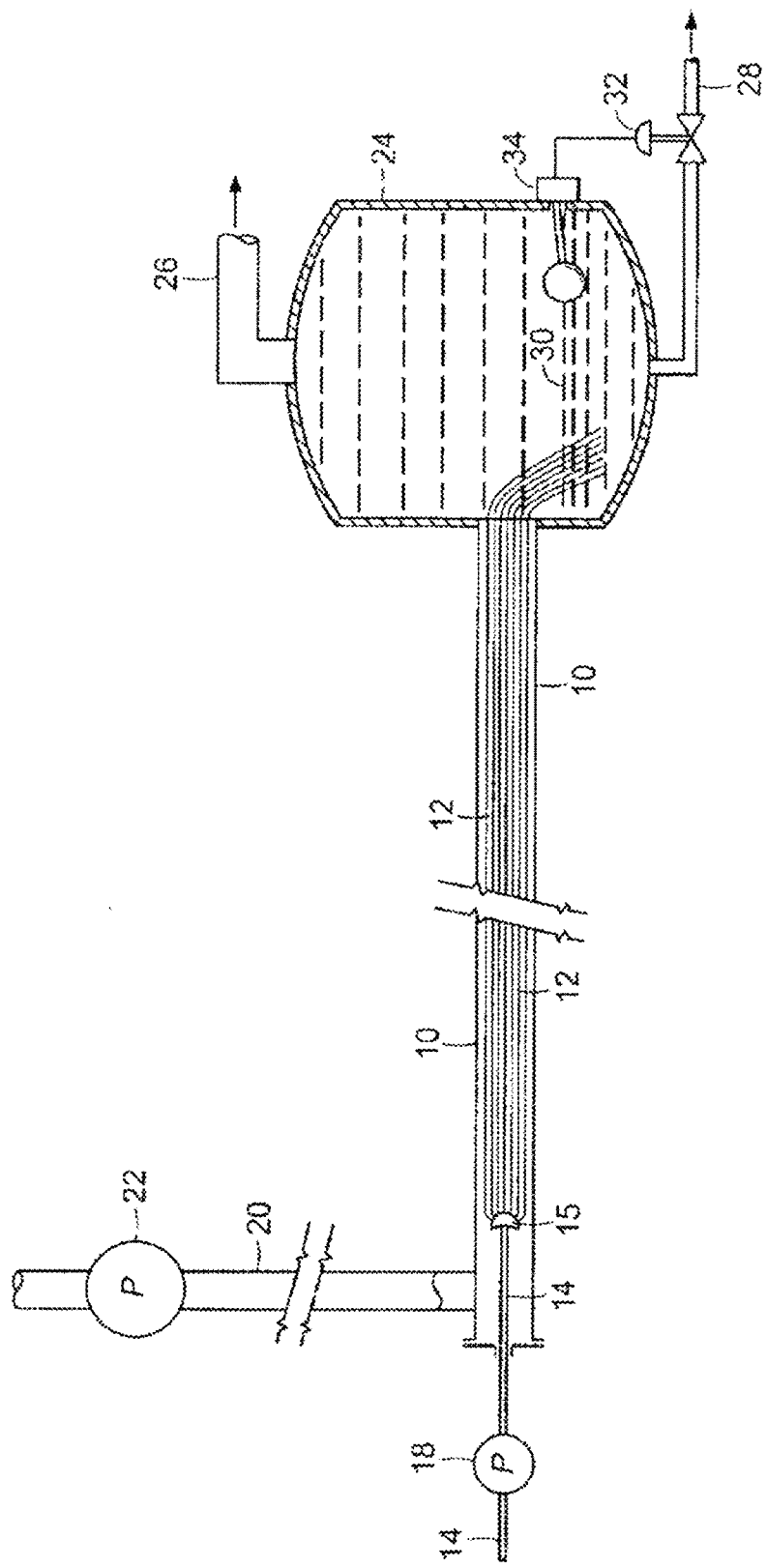
FIG. 1 is a diagrammatic illustration of a fiber conduit contactor used in an embodiment of the present disclosure.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, a fiber conduit contactor may include a conduit 10 having a bundle of elongated fibers 12 within the conduit 10 for a portion of its length. Fibers 12 are secured to tube 14 at node 15. Tube 14 extends beyond one end of conduit 10 and is operatively associated with metering pump 18 which pumps a first (constrained) phase liquid through tube 14 and onto fibers 12. Operatively connected to conduit 10 upstream of node 15 is inlet pipe 20 which is operatively associated with metering pump 22. This pump 22 supplies a second (continuous) phase liquid through inlet pipe 20 and into conduit 10, where it is squeezed between the constrained coated fibers 12. At the downstream end of conduit 10 is gravity separator or settling tank 24 into which the downstream end of fibers 12 may extend. Operatively associated with an upper portion of gravity separator 24 is outlet line 26 for outlet of one of the liquids, and operatively associated with a lower portion of gravity separator 24 is outlet line 28 for outlet of the other liquid, with the level of interface 30 existing between the two liquids being controlled by valve 32, operatively associated with outlet line 28 and adapted to act in response to a liquid level controller indicated generally by numeral 34.

Although the fiber conduit contactor shown in FIG. 1 is arranged such that fluid flow traverses in a horizontal manner, the arrangement of the fiber conduit contactor is not so limited. In some cases, the fiber conduit contactor may be arranged such that inlet pipes 14 and 20 as well as node 15 occupy an upper portion of the apparatus and settling tank 24 occupies the bottom portion of the apparatus. For example, the fiber conduit contactor shown in FIG. 1 may be rotated approximately 90° in parallel with the plane of the paper to arrange inlet pipes 14 and 20, node 15 and settling tank 24 in the noted upper and lower positions. Such an arrangement may capitalize on gravity forces to aid in propelling fluid through the contactor. In yet other embodiments, the fiber conduit contactor depicted in FIG. 1 may be rotated approximately 90° in the opposite direction parallel with the plane of the paper such that inlet pipes 14 and 20 and node 15 occupies the bottom portion of the apparatus and settling tank 24 occupies the upper portion of the apparatus. In such cases, the hydrophilicity, surface tension, and repulsion of the continuous phase fluid will keep the constrained phase fluid constrained to the fibers regardless of whether the fluids are flowing up, down, or sideways and, thus, sufficient contact can be attained to affect the desired reaction and/or extraction without the need to counter gravity forces. It is noted that such an inverted arrangement of a fiber conduit contactor is applicable for any of the extraction processes described herein as well as any other type of fluid contact process that may be performed in a fiber conduit contactor. It is further noted that fiber conduit contactors may be arranged in a slanted position for any of the extraction processes described herein or for any other process that may be performed in a fiber conduit contactor (i.e., the sidewalls of the fiber conduit contactor may be arranged at any angle between 0° and 90° relative to a floor of a room in which the fiber conduit contactor is arranged).

During operation, an extractant liquid or reactant liquid can be introduced through tube 14 and onto fibers 12. Another liquid can be introduced into conduit 10 through inlet pipe 20 and through void spaces between fibers 12. Fibers 12 will be wetted by the extractant preferentially to the other liquid. The extractant will form a film on fibers 12, and the other liquid will flow therethrough. Due to the relative movement of the other liquid with respect to the extractant film on fibers 12, a new interfacial boundary between the other liquid phase and the extractant is continuously being formed, and as a result, fresh liquid is brought in contact with the extractant, thus causing and accelerating the extraction.

In one or more embodiments, the constrained phase includes an alcohol and, optionally, a caustic catalyst. The alcohol may include one or more of methanol, ethanol, n-propanol, isopropanol, n-butanol, isobutanol, 2-butanol, and tent-butanol. In some embodiments, the alcohol includes ethanol in an amount of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, or 100 wt %. In some embodiments, the alcohol includes a mixture of ethanol and methanol. In some embodiments, based on the total weight of the constrained phase, the alcohol may constitute 100 wt %, at least 99.9 wt %, at least 99.75 wt %, at least 99.5 wt %, at least 99.25 wt %, at least 99 wt %, at least 98.75 wt %, at least 98.5 wt %, at least 98.25 wt %, at least 98 wt %, at least 97.75 wt %, at least 97.5 wt %, at least 97.25 wt %, at least 97 wt %, at least 96.75 wt %, at least 96.5 wt %, at least 96.25 wt %, at least 96 wt %, at least 95.75 wt %, at least 95.5 wt %, at least 95.25 wt %, or at least 95 wt %.

The caustic catalyst may include one or more basic compounds. Basic compounds may include, e.g., sodium hydroxide, potassium hydroxide, sodium methoxide, and/or sodium ethoxide. In some embodiments, based on the total weight of the constrained phase, the caustic catalyst may constitute 0 to 5 wt %. For example, the caustic catalyst may be present in a range defined by any of the following upper and lower limits: at least 0.25 wt %, at least 0.5 wt %, at least 0.75 wt %, at least 1.25 wt %, at least 1.5 wt %, at least 1.75 wt %, at least 2 wt %, at least 2.25 wt %, at least 2.5 wt %, at least 2.75 wt %, at least 3 wt %, at least 3.25 wt %, at least 3.5 wt %, at least 3.75 wt %, at least 4 wt %, at least 4.25 wt %, at least 4.5 wt %, at least 4.75 wt %, at most 0.5 wt %, at most 0.75 wt %, at most 1.25 wt %, at most 1.5 wt %, at most 1.75 wt %, at most 2 wt %, at most 2.25 wt %, at most 2.5 wt %, at most 2.75 wt %, at most 3 wt %, at most 3.25 wt %, at most 3.5 wt %, at most 3.75 wt %, at most 4 wt %, at most 4.25 wt %, at most 4.5 wt %, and/or at most 4.75 wt %. In any embodiment, the alcohol may include methanol and the caustic catalyst may include sodium methoxide. In any embodiment, the alcohol may include ethanol and the caustic catalyst may include sodium ethoxide and/or sodium methoxide.

According to one or more embodiments, a feedstock oil constitutes the continuous phase and is not particularly limited. The feedstock oil may include, e.g., vegetable oils, animal oils, or a combination of vegetable oils and animal oils. Non-limiting examples of vegetable oils include corn oil, palm oil, cottonseed oil, frying oil, etc. To avoid the production of soap during the reaction, the content of FFAs may be, e.g., 3 wt % or less, 2.5 wt % or less, 2 wt % or less, 1.5 wt % or less, 1 wt % or less, or 0.5 wt % or less. For similar reasons, the moisture content of the feedstock oil may be limited to, e.g., 500 ppm or less, 400 ppm or less, 300 ppm or less, 200 ppm or less, 100 ppm or less, 50 ppm or less, 40 ppm or less, 30 ppm or less, 20 ppm or less, or 10 ppm or less.

In one or more embodiments, the feedstock oil described above may constitute the constrained phase and the alcohol and, optionally, the caustic catalyst described above may constitute the continuous phase. In one or more embodiments, the feedstock oil and the alcohol (optionally containing the caustic catalyst) may be simultaneously introduced into the fiber conduit contactor such that a mixture thereof is constrained to the fibers and a mixture thereof flows between the fibers (i.e., the mixture constitutes both the constrained and continuous phases).

The flow rate of the feedstock oil per 5 $cm^2$ of reactor cross-sectional area is not particularly limited and, in some embodiments, may be, e.g., 100 to 2000 ml/min, 100 to 150 ml/min, 75 to 125 ml/min, 50 to 75 ml/min, 25 to 50 ml/min, or 10 to 20 ml/min. The flow rate of the constrained phase per 5 $cm^2$ of reactor cross-sectional area is not particularly limited and, in some embodiments, may be, e.g., 5 to 100 ml/min, 10 to 20 ml/min, 30 to 50 ml/min, 40 to 75 ml/min, 50 to 100 ml/min, or 70 to 120 ml/min. The foregoing values are all based upon a conduit having a cross-sectional area of 5 $cm^2$ and it will be appreciated that these values may be appropriately scaled for a larger or smaller conduit. A molar ratio of alcohol to feedstock may be, e.g., 3:1 to 16:1, 3:1 to 9:1, or 3:1 to 6:1.

Due to the eventual miscibility of the continuous phase (e.g., the feedstock oil described above) and the constrained phase (e.g., the alcohol composition described above), the reactants do not need extended time in the fiber conduit contactor. The length of the fiber conduit contactor is not particularly limited and may be, e.g., 0.25 to 10 m, 0.5 to 5 m, 0.75 to 3 m, 1 to 2.5, or 1.5 to 2 m. The diameter or width of the fiber conduit contactor is likewise not particularly limited and may be, e.g., 0.5 cm to 3 m, 0.5 cm to 1 m, 0.5 to 50 cm, 0.5 to 30 cm, 1 to 25 cm, 1.5 to 20 cm, 2 to 15 cm, 2.5 to 10 cm, 2.5 to 7.5 cm, or 3 to 5 cm.

The fiber materials for the extraction processes described herein may be, but are not limited to, cotton, jute, silk, treated or untreated minerals, metals, metal alloys, treated and untreated carbon allotropes, polymers, polymer blends, polymer composites, nanoparticle reinforced polymer, combinations thereof, and coated fibers thereof for corrosion resistance or chemical activity. In general, the fiber type is selected to match the desired constrained phase. For example, organophilic fibers may be used with a constrained phase that is substantially organic. This arrangement can, for example, be used to extract organic materials from water with organic liquids constrained to the fibers. Suitable treated or untreated minerals include, but are not limited to, glass, alkali resistant glass, E-CR glass, quartz, ceramic, basalt, combinations thereof, and coated fibers thereof for corrosion resistance or chemical activity. Suitable metals include, but are not limited to, iron, steel, stainless steel, nickel, copper, brass, lead, thallium, bismuth, indium, tin, zinc, cobalt, titanium, tungsten, nichrome, zirconium, chromium, vanadium, manganese, molybdenum, cadmium, tantalum, aluminum, anodized aluminum, magnesium, silver, gold, platinum, palladium, iridium, alloys thereof, and coated metals.

Suitable polymers include, but are not limited to, hydrophilic polymers, polar polymers, hydrophilic copolymers, polar copolymers, hydrophobic polymers/copolymers, non-polar polymers/copolymers, and combinations thereof, such as polysaccharides, polypeptides, polyacrylic acid, polyhydroxybutyrate, polymethacrylic acid, functionalized polystyrene (including but not limited to, sulfonated polystyrene and aminated polystyrene), nylon, polybenzimidazole, polyvinylidenedinitrile, polyvinylidene chloride and fluoride, polyphenylene sulfide, polyphenylene sulfone, polyethersulfone, polymelamine, polyvinyl chloride, polyvinyl acetate, polyvinyl alcohol, co-polyethylene-acrylic acid, polyethylene terephthalate, ethylene-vinyl alcohol copolymers, polyethylene, polychloroethylene, polypropylene, polybutadiene, polystyrene, polyphenol-formaldehyde, polyurea-formaldehyde, polynovolac, polycarbonate, polynorbornene, polyfluoroethylene, polyfluorochloroethylene, polyepoxy, polyepoxyvinylester, polyepoxynovolacvinylester, polyimide, polycyanurates, silicone, liquid crystal polymers, derivatives, composites, nanoparticle reinforced, and the like.

In any embodiment, fibers can be treated for wetting with preferred phases, to protect from corrosion by the process streams, and/or coated with a functional polymer. For instance, carbon fibers can be oxidized to improve wettability in aqueous streams and polymer fibers can display improved wettability in aqueous streams and/or be protected from corrosion by incorporation of sufficient functionality into the polymer, including but not limited to, hydroxyl, amino, acid, base, enzyme, or ether functionalities. In one or more embodiments, the fibers may include a chemical bound (i.e., immobilized) thereon to offer such functionalities. In some embodiments, the fibers may be ion exchange resins, including those suitable for hydroxyl, amino, acid, base or ether functionalities. In one or more embodiments, glass and other fibers can be coated with acid, base, or ionic liquid functional polymer. As an example, carbon or cotton fibers coated with an acid resistant polymer may be applicable for processing strong acid solutions. In one or more embodiments, fibers may include materials that are catalytic or extractive for particular processes. In some cases, the enzymatic groups may comprise the fibers to aid in particular reactions and/or extractions.

In one or more embodiments, all the fibers within a conduit contactor may be of the same material (i.e., have same core material and, if applicable, the same coating). In other embodiments, the fibers within a conduit contactor may include different types of materials. For example, a conduit contactor may include a set of polar fibers and a set of non-polar fibers. Other sets of varying materials for fibers may be considered. As noted above, the configuration of fibers (e.g., shape, size, number of filaments comprising a fiber, symmetry, asymmetry, etc.) within a conduit contactor may be the same or different for the processes described herein. Such variability in configuration may be in addition or alternative to a variation of materials among the fibers. In some embodiments, different types of fibers (i.e., fibers of different configurations and/or materials) may run side by side within a contactor with each set having their own respective inlet and/or outlet. In other embodiments, the different types of fibers may extend between the same inlet and outlet. In either embodiment, the different types of fibers may be individually dispersed in the conduit contactor or, alternatively, each of the different fiber types may be arranged together. In any embodiment, the use of different types of fibers may facilitate multiple separations, extractions, and/or reactions to be performed simultaneously in a conduit contactor from a singular or even a plurality of continuous phase streams. For example, in a case in which a conduit contactor is filled with multiple bundles of respectively different fiber types each connected to its own constrained phase fluid inlet and arranged off-angle, the bundles could be arranged for the continuous phase fluid to pass sequentially over the multiple fiber bundles with different materials extracted by or from each bundle. The fiber diameter is not particularly limited and may be, e.g., 5 to 250 µm, 10 to 100 µm, 12 to 75 µm, 15 to 60 µm, 17 to 50 µm, 20 to 45 µm, 20 to 35 µm, or 20 to 25 µm.

As used herein, the void fraction within the fiber conduit contactor is the total cross-sectional area of the fiber conduit contactor (where the cross section is taken perpendicular to the fiber conduit contactor longitudinal axis) minus the cross-sectional area of all of the fibers combined, divided by the total cross-sectional area. Thus, the void fraction represents the total percentage cross-sectional area available for fluid flow within the fiber conduit contactor. In some embodiments, the void fraction may be greater than 10%, greater than 20%, greater than 30%, greater than 40%, or greater than 50%. In some embodiments, the void fraction may be less than 50%, less than 45%, less than 40%, less than 35%, less than 30%, less than 25%, less than 20%, less than 15%, less than 10%, or less than 5%. Depending on the size and shape of the fibers, a minimum void fraction may be, e.g., at least 1%, at least 5%, at least 10%, at least 15%, at least 20%, at least 25%, at least 30%, at least 35%, at least 40%, or at least 50%.

The temperature of the reaction may be, e.g., 25° C., 30° C., 35° C., 40° C., 45° C., 50° C., 55° C., 60° C., 65° C., 70° C., 75° C., 80° C., 85° C., 90° C., 95° C., 100° C., or greater than 100° C., or may range between any of the foregoing temperature values. In some embodiments, the reaction temperature is limited to the boiling point of the alcohol. However, operating the fiber conduit contactor at pressure allows the use of reaction temperatures in excess of the boiling points of the reactants and allows reaction temperatures to exceed 100° C. The pressure within the fiber conduit contactor is not particularly limited and may be, e.g., 0 to 50 psi, 5 to 75 psi, 10 to 60 psi, 15 to 40 psi, 20 to 30 psi, or 25 psi.

After the constrained phase and continuous phase react and become miscible (forming a single phase), the single phase may be separated into two phases by adding an appropriate agent, such as water, to reject the biodiesel from the glycerol. In some embodiments, this may be accomplished by using a second fiber conduit contactor (such as the fiber conduit contactor described herein), wherein the constrained phase comprises the agent (e.g., water) and the continuous phase is the single phase from the first fiber conduit contactor. Alternatively, the agent may be added directly to the separator 24. In some embodiments, the agent may be introduced to the fibers downstream from the inlet pipes 14 and 20. To avoid the production of soap emulsion during this separation, a small amount of acid may be added in any amount from 0.05-2.5 wt %. Suitable acids include, but are not limited to, citric acid, carbonic acid, hydrochloric acid, phosphoric acid, sulfuric acid, or nitric acid.

In one or more embodiments, the separation step may comprise introducing the biodiesel and glycerol into a second fiber conduit contactor after a water phase has been introduced into the fiber conduit contactor. In one or more embodiments, the biodiesel and glycerol may be reintroduced into the same fiber conduit contactor after a water phase has been introduced into the fiber conduit contactor. In another embodiment, the biodiesel may separate by adding the biodiesel and glycerol to a separatory funnel, shaking the mixture, allowing the aqueous phase to separate from the organic phase (the biodiesel), and then separately withdrawing the two phases from the funnel.

Figure 5:
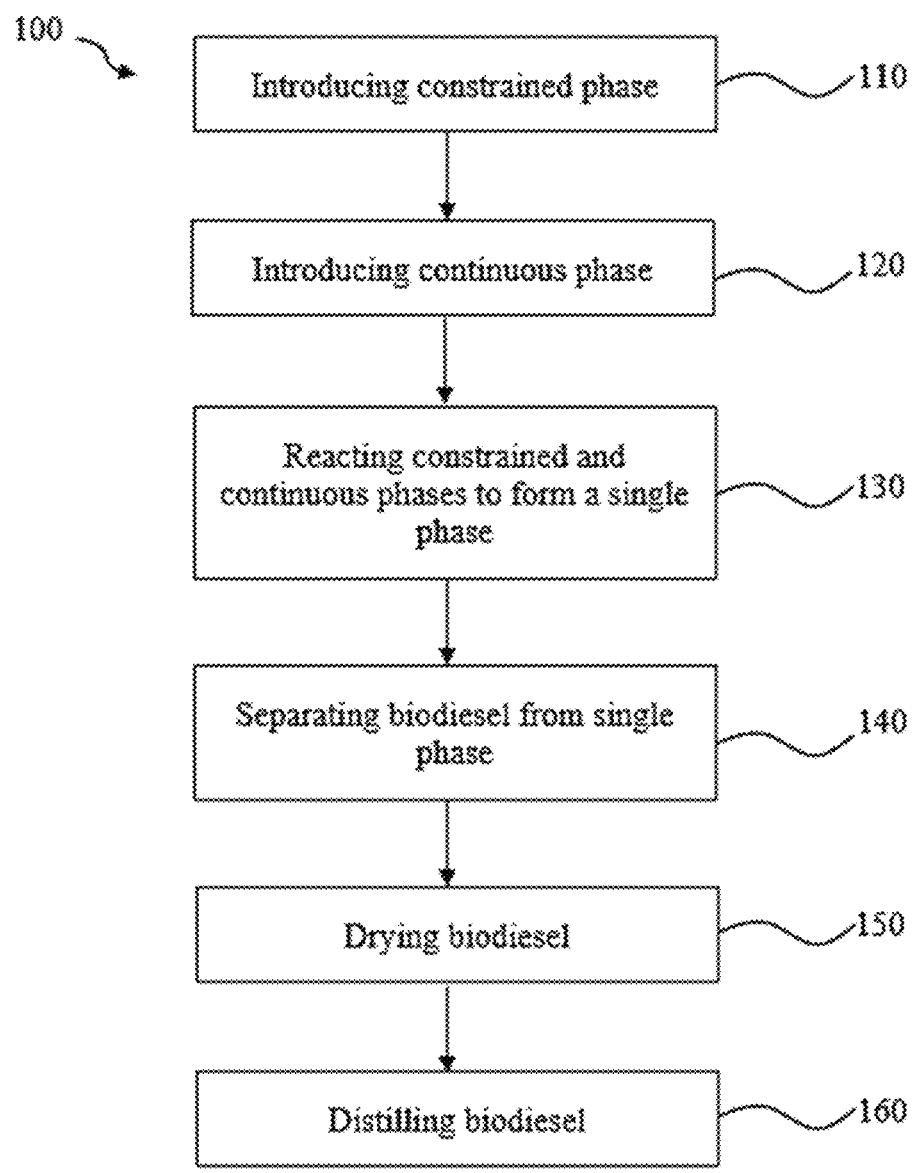
FIG. 5 is a diagrammatic illustration of a biodiesel synthesis method according to an embodiment of the present disclosure.

With reference to FIG. 5, a method 100 of synthesizing biodiesel according to the present disclosure is illustrated. In a step 110, a constrained phase is introduced into the fiber conduit contactor proximate the plurality of fibers. The constrained phase may be as described above. In a subsequent step 120, a continuous phase is introduced into the fiber conduit contactor proximate the plurality of fibers. The continuous phase may be as described above. In some embodiments, the continuous phase and the constrained phase flow in the same direction. In such embodiments, the continuous phase may be introduced downstream of the constrained phase. In other of such embodiments, the continuous phase may be introduced upstream of the constrained phase. In other embodiments, the continuous phase and constrained phase flow countercurrent to one another and may be introduced proximate either end of the fiber conduit contactor.

In a step 130, the continuous phase and the constrained phase are reacted to form a single phase. The duration of step 130 depends on, among other factors, the length of the fiber conduit contactor and the flow rates of the respective continuous and constrained phases. In a step 140, the biodiesel is separated out of the single phase. Step 140 may include utilizing a second fiber conduit contactor, a constrained phase including water and an acid, and a continuous phase being the single phase, wherein the constrained and continuous phases are introduced as described above, and biodiesel is separately removed from a downstream end of the fiber conduit contactor, e.g., from a separator. Alternatively, a single fiber conduit contactor may be used for method 100, wherein a new constrained phase including water is introduced into the fiber conduit contactor, the single phase is reintroduced into the fiber conduit contactor as the continuous phase, and then biodiesel is separately removed from a downstream end of the fiber conduit contactor, e.g., from a separator. In another embodiment, step 140 may comprise adding the single phase to a container, such as a separatory funnel, with water and, optionally, an acid, shaking the mixture, and then separating an aqueous phase from the biodiesel (or separating the biodiesel from the aqueous phase).

In any embodiment, the method may include a step 150, wherein the isolated biodiesel is dried to remove residual water and ethanol. Any appropriate apparatus may be utilized for the drying step, such as a rotary evaporator. In any embodiment, the method may include a step 160, wherein the dried biodiesel is further distilled to remove any residual monoglyceride, soaps, and color bodies. Any appropriate apparatus may be utilized for the distilling step, such as a rotary evaporator.

Example 1

Figure 2:
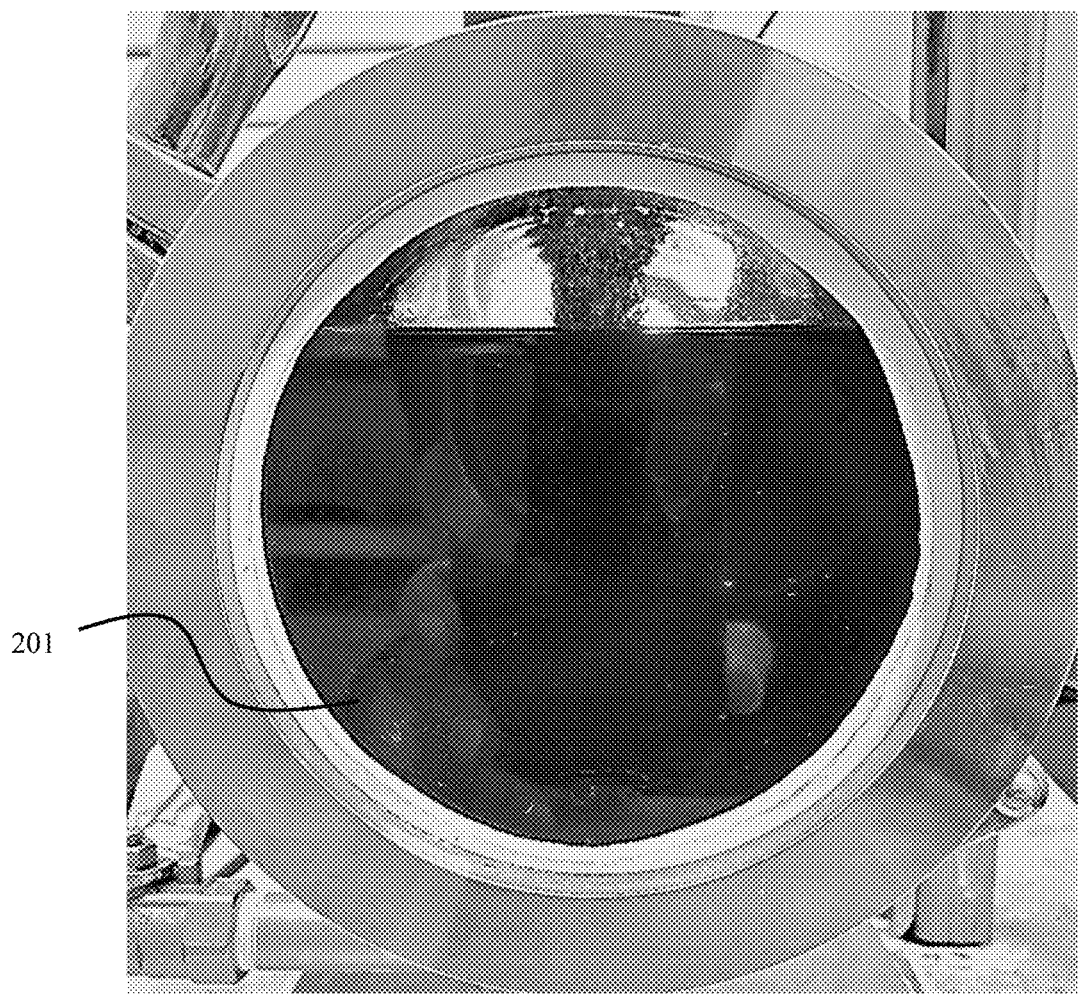
FIG. 2 is a photograph of a one-phase composition prepared in Example 1.

A fiber conduit contactor was prepared having a 1" diameter conduit, 50 μm fibers, and a void fraction of approximately 50%. A constrained phase including ethanol and 0.6 wt % sodium ethoxide was introduced to the fibers at a rate of 77 ml/min. Corn oil was then introduced as a continuous phase at a rate of 140 ml/min (9:1 molar ratio of ethanol:triglyceride). The temperature of the fiber conduit contactor was set at 65° C. and 0 psi pressure was recorded. The resultant one-phase composition 201 is shown in FIG. 2.

Figure 3:
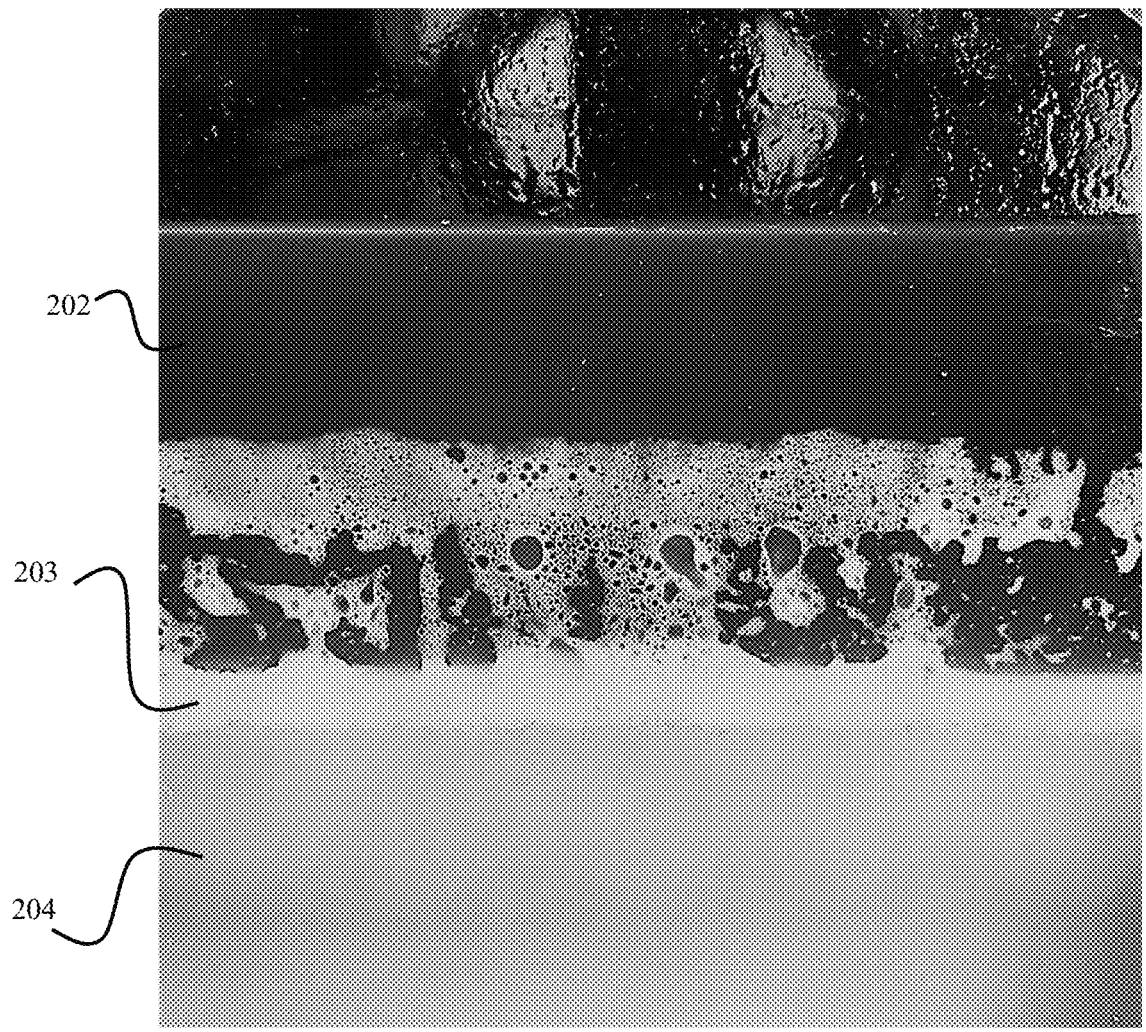
FIG. 3 is a photograph of a two-phase composition prepared in Example 1.

Biodiesel and glycerol (byproduct) were collected in an accumulator as a single uniform phase. About 1000 ml of the single phase was added to a separatory funnel with about 200 ml of water with 0.2 wt % phosphoric acid and shaken. Within 5 mins, the biodiesel was collected as the top phase and the glycerol (caustic phase) was collected as the bottom phase. The resultant two-phase composition is shown in FIG. 3 and the emulsion, reported by other researchers as a complication of water-washing, is clearly visible. In FIG. 3, a top phase 202 includes the separated biodiesel while a bottom phase 204 includes caustic phase. An interface 203 is also visible between the top phase 202 and bottom phase 204. The biodiesel phase was analyzed using gel permeation chromatography (GPC), which showed a 99% conversion of the corn oil to biodiesel after a total process time of 2 hours. Samples taken at the exit of the conduit contactor into the accumulator showed a 97% conversion of corn oil to biodiesel after a 60 second residence time in the fiber film contactor.

Example 2

A fiber conduit contactor was prepared having a 1" diameter conduit, 50 μm fibers, and a void fraction of approximately 50%. A constrained phase including ethanol and 1.2 wt % sodium ethoxide was introduced to the fibers at a rate of 77 ml/min. Corn oil was then introduced as a continuous phase at a rate of 140 ml/min. The temperature of the fiber conduit contactor was set at 65° C. and 0 psi pressure was recorded. Biodiesel and glycerol (as a byproduct) were collected in an accumulator as a single uniform phase.

Figure 4:
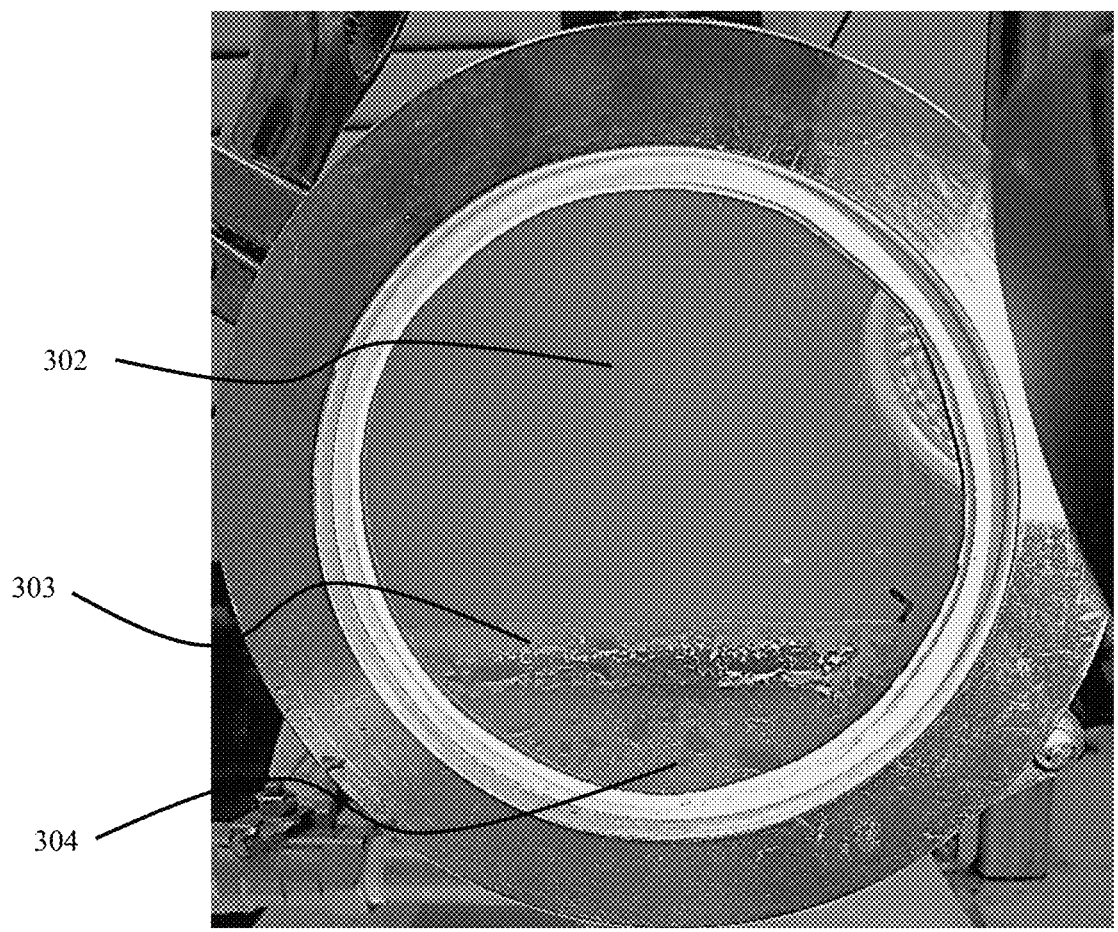
FIG. 4 is a photograph of a two-phase composition prepared in Example 2.

The same fiber conduit contactor was used for a water wash, wherein a constrained phase including water and 0.3% phosphoric acid was introduced to the fibers at a rate of 15 mL/min. The single uniform phase collected in the accumulator (i.e., biodiesel including glycerol) was then introduced as a continuous phase at a rate of 75 mL/min. The temperature of the fiber conduit contactor was set to room temperature and 0 psi pressure was recorded. The resultant two-phase composition is shown in FIG. 4. Biodiesel was collected in the accumulator as the top phase 302 and glycerol was collected as the bottom phase 304. An interphase 303 is also visible in FIG. 4. The biodiesel phase was analyzed using gel permeation chromatography (GPC), which showed a 99% conversion of the corn oil to biodiesel after a total process time of 2 hours.

Example 3

A 3 ft fiber conduit contactor was prepared having a 1" diameter conduit, 50 μm fibers, and a void fraction of approximately 50%. A constrained phase including ethanol and 0.6 wt % sodium ethoxide was introduced to the fibers at a rate of 77 ml/min. Corn oil was then introduced as a continuous phase at a rate of 140 ml/min. The temperature of the fiber conduit contactor was set at 65° C. and 0 psi pressure was recorded.

Biodiesel and glycerol (byproduct) were collected in an accumulator as a single uniform phase. About 1000 ml of this single phase was added to a separatory funnel with 200 ml of water and shaken. Within 5 mins, the biodiesel was collected as the top phase and the glycerol (caustic phase) was collected as the bottom phase. The collected biodiesel phase was dried via a rotary evaporator to remove any residual water and ethanol and then distilled using the same apparatus to remove any residual monoglyceride, soaps, and color bodies. The resulting biodiesel was analyzed using GPC, which showed >99.5% conversion of the corn oil to biodiesel. The resulting sample was sent for ASTM D 6751-19 analysis to verify that the fuel met all commercial specifications, the results of which are shown in TABLE 1 below.

TABLE 1

Biodiesel Certificate of Analysis ASTM D 6751-19 from Iowa Central Fuel Testing Laboratory.

| Test | Method | Result | Unit | ASTM limit | Pass/Fail |
|---|---|---|---|---|---|
| Calcium & Magnesium | EN 14538 | 0.0 | ppm | 5, max | P |
| Flash point, closed cup | D 93 | 163.0 | ° C. | 93, min | P |
| Alcohol Control: | | | | | |
| Option 1: Methanol | EN 14110 | | mass % | 0.2, max | |
| Option 2: Flash Point | D 93 | 163.0 | ° C. | 130, min | P |
| Water and Sediment | D 2709 | <0.010 | % volume | 0.050, max | P |
| Kinematic Viscosity cSt@40° C. | D 445 | 4.213 | mm$^2$/sec. | 1.9-6.0 | P |
| Sulfated Ash | D 874 | <0.005 | % mass | 0.020, max | P |
| Sulfur | D 5453 | 1.0 | ppm | 15, max | P |
| Copper Corrosion at 50° C. | D 130 | 1A | n/a | No. 3, max | P |
| Cetane Number | D 613[4] | 52.3 | n/a | 47, min | P |
| Cloud Point | D 2500 | −7 | ° C. | Report | Report |
| Carbon Residue | D 4530 | 0.000 | % mass | 0.050, max | P |
| Total Acid Number | D 664 | 0.06 | mg KOH/g | 0.50, max | P |
| Cold Soak Filterability | D 7501 | 85 | seconds | 360, max[B] | |
| Free Glycerin | D 6584 | 0.018 | % mass | 0.020 max | P |
| Total Glycerin: | D 6584 | 0.025 | % mass | 0.240 max | P |
| Monoglycerides | D 5584 | 0.027 | % mass | n/a | |
| Diglycerides | D 6584 | 0.000 | % mass | n/a | |
| Triglycerides | D 6584 | 0.000 | % mass | n/a | |
| Phosphorus | D 4951 | 0.000000 | % mass | 0.001, max | P |
| Distillation at 90% rec., ATE | D 1160 | 358.5 | ° C. | 360, max | P |
| Sodium & Potassium | EN 14538 | 0.2 | ppm | 5, max | P |
| Oxidation Stability | EN 15751 | 6.6 | hours | 3, min | P |
| Other Tests: | | | | | |
| Visual Inspection | D 4176 | 1 | haze | 2 | P |
| Relative Density @15.6° C. (60° F.) | D 4052 | | n/a | Report | |
| KF Moisture (Volumetric) | E 203 | | % mass | Report | |
| Total Contamination | D 7321 | | Mg/L | Report | |

Notes:
APerformed by outside laboratory.
B360 max for Grade 2B. 200 max for Grade 1B, with max 0.400 for monoglycerides.

A method of producing biodiesel using a conduit contactor in fluid communication with a collection vessel has been described herein. The method comprises: introducing a first stream comprising an alcohol proximate a plurality of fibers positioned within the conduit contactor and extending proximate to the collection vessel; introducing a second stream comprising an oil into the conduit contactor proximate to the plurality of fibers, wherein the second stream is in contact with the first stream; reacting the oil and the alcohol to for a single phase; receiving the single phase in the collection vessel; and separating biodiesel from the single phase.

The method may include any combination of the following features:

The alcohol comprises ethanol;

The first stream further comprises a caustic additive;

The caustic additive is present in an amount of at most 1.5 wt %, based on a total weight of the first stream;

Separating biodiesel from the single phase comprises washing the single phase with water and an acid;

Separating biodiesel from the single phase comprises: introducing a third stream comprising water and an acid proximate a plurality of fibers positioned within a second conduit contactor and extending proximate to one or more collection vessels; introducing the single phase into the conduit contactor proximate to the plurality of fibers; and withdrawing separately biodiesel and the third stream from the one or more collection vessels;

Separating biodiesel from the single phase comprises: introducing a third stream comprising water and an acid into the conduit contactor proximate the plurality of fibers; introducing the single phase into the conduit contactor proximate the plurality of fibers; and withdrawing separately from the conduit contactor the biodiesel and the third stream;

Separating biodiesel from the single phase comprises: adding water and an acid to the single phase to form an aqueous phase and an organic phase; and separating the aqueous phase from the organic phase;

A step of drying the biodiesel to remove water and/or ethanol therefrom;

A step of distilling the biodiesel; and/or

The oil is corn oil.

A method of producing biodiesel using a fiber conduit contactor having a plurality of fibers disposed therein has been described herein. The method comprises: wetting the plurality of fibers with a first composition comprising an alcohol; contacting the wetted plurality of fibers with a second composition comprising an oil, thereby forming a biodiesel phase; and separating biodiesel from the biodiesel phase.

The method may include any combination of the following features:
- The alcohol comprises ethanol and the first composition further comprises a caustic additive;
- The caustic additive is present in an amount of at most 1.5 wt %, based on a total weight of the first stream;
- The biodiesel phase comprises biodiesel and glycerol;
- Separating biodiesel from the biodiesel phase comprises contacting the biodiesel phase with a third composition comprising water and an acid; and/or
- The biodiesel phase is contacted with the third composition comprising water and an acid in the fiber conduit contactor.

A system for producing biodiesel has been described herein. The system includes a fiber conduit contactor comprising: a conduit having a hollow interior, a first open end, and a second open end opposite the first open end; a collection vessel in fluid communication with and proximate the second open end; and a plurality of fibers disposed within the conduit; a first stream supply configured to introduce a first stream comprising an alcohol into the conduit and onto the fibers; and a second stream supply configured to introduce a second stream comprising an oil into the conduit such that the second stream contacts the first stream; wherein the first stream and the second stream are substantially immiscible.

The system may include any combination of the following features:
- The alcohol comprises ethanol;
- The first stream further comprises a caustic additive;
- The caustic additive is present in an amount of at most 1.5 wt %, based on a total weight of the first stream;
- The oil is corn oil;
- A second fiber conduit contactor comprising: a second conduit having a hollow interior, a first open end, and a second open end opposite the first open end; a separator in fluid communication with and proximate the second open end; and a second plurality of fibers disposed within the conduit; a third stream supply configured to introduce a third stream comprising water and an acid into the second conduit; a communication line configured to introduce contents of the collection vessel into the second conduit;
- A third stream supply configured to introduce a third stream comprising water and an acid into the conduit; and a communication line configured to reintroduce contents of the collection vessel into the conduit;
- The collection vessel is a separator; and/or
- A separator in fluid communication with the collection vessel.

It is understood that variations may be made in the foregoing without departing from the scope of the present disclosure. In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

What is claimed is:

1. A method of producing biodiesel using a conduit contactor in fluid communication with a collection vessel, the method comprising:
   introducing a first stream comprising an alcohol proximate a plurality of fibers positioned within the conduit contactor and extending proximate to the collection vessel;
   introducing a second stream comprising an oil into the conduit contactor proximate to the plurality of fibers, wherein the second stream is in contact with the first stream;
   reacting the oil and the alcohol to form a single phase;
   receiving the single phase in the collection vessel; and
   separating biodiesel from the single phase;
   wherein separating biodiesel from the single phase comprises:
   (i) introducing a third stream comprising water and an acid proximate a plurality of fibers positioned within a second conduit contactor and extending proximate to one or more collection vessels: introducing the single phase into the second conduit contactor proximate to the plurality of fibers; and withdrawing separately biodiesel and the third stream from the one or more collection vessels; or
   (ii) introducing a third stream comprising water and an acid into the conduit contactor proximate the plurality of fibers; introducing the single phase into the conduit contactor proximate the plurality of fibers; and withdrawing separately from the conduit contactor the biodiesel and the third stream.

2. The method of claim 1, wherein the alcohol comprises ethanol, the first stream further comprises a caustic additive, and the oil is corn oil.

3. The method of claim 2, wherein the caustic additive is present in an amount of at most 1.5 wt %, based on a total weight of the first stream.

4. The method of claim 1, wherein separating biodiesel from the single phase comprises:
   introducing the third stream comprising water and the acid proximate the plurality of fibers positioned within the second conduit contactor and extending proximate to one or more collection vessels;
   introducing the single phase into the conduit contactor proximate to the plurality of fibers; and
   withdrawing separately biodiesel and the third stream from the one or more collection vessels.

5. The method of claim 1, wherein separating biodiesel from the single phase comprises:
   introducing the third stream comprising water and the acid into the conduit contactor proximate the plurality of fibers;
   introducing the single phase into the conduit contactor proximate the plurality of fibers; and
   withdrawing separately from the conduit contactor the biodiesel and the third stream.

6. The method of claim 1, further comprising drying the biodiesel to remove water and/or ethanol therefrom.

7. The method of claim 1, further comprising distilling the biodiesel.

8. A method of producing biodiesel using a fiber conduit contactor having a plurality of fibers disposed therein, the method comprising:
   wetting the plurality of fibers with a first composition comprising an alcohol;
   contacting the wetted plurality of fibers with a second composition comprising an oil, thereby forming a biodiesel phase; and
   separating biodiesel from the biodiesel phase;

wherein separating biodiesel from the biodiesel phase comprises contacting the biodiesel phase with a third composition comprising water and an acid in the fiber conduit contactor.

9. The method of claim 8, wherein the alcohol comprises ethanol and the first composition further comprises a caustic additive.

10. The method of claim 9, wherein the caustic additive is present in an amount of at most 1.5 wt %, based on a total weight of the first stream.

11. The method of claim 8, wherein the biodiesel phase comprises biodiesel and glycerol.

\* \* \* \* \*

UNITED STATES PATENT AND TRADEMARK OFFICE
CERTIFICATE OF CORRECTION

| | | |
|---|---|---|
| PATENT NO. | : 12,297,404 B2 | Page 1 of 1 |
| APPLICATION NO. | : 17/440929 | |
| DATED | : May 13, 2025 | |
| INVENTOR(S) | : Pulinkumar N. Patel and Kei Fuchigami | |

It is certified that error appears in the above-identified patent and that said Letters Patent is hereby corrected as shown below:

In the Specification
Column 5, Line 24, change "tent-butanol" to --*tert*-butanol--
Table 1, Column 11, Line 30, change "Monoglycerides D 5584" to --Monoglycerides D 6584--
Table 1, Column 11, Line 43, change "APerformed" to --$^A$Performed--
Table 1, Column 11, Line 44, change "B360" to --$^B$360--

In the Claims
Claim 1, Column 14, Line 18, change "vessels:" to --vessels;--

Signed and Sealed this
First Day of July, 2025

Coke Morgan Stewart
*Acting Director of the United States Patent and Trademark Office*